US011110744B2

(12) United States Patent
Bromm

(10) Patent No.: US 11,110,744 B2
(45) Date of Patent: Sep. 7, 2021

(54) REMOVABLE WHEEL RETAINER RELEASE ASSEMBLY

(71) Applicant: Scott Bromm, Lake Geneva, WI (US)

(72) Inventor: Scott Bromm, Lake Geneva, WI (US)

( * ) Notice: Subject to any disclaimer, the term of this patent is extended or adjusted under 35 U.S.C. 154(b) by 365 days.

(21) Appl. No.: 16/350,575

(22) Filed: Dec. 4, 2018

(65) Prior Publication Data
US 2020/0171881 A1    Jun. 4, 2020

(51) Int. Cl.
*B60B 27/06* (2006.01)
*B60B 37/10* (2006.01)
*B60B 37/04* (2006.01)
*B60B 27/02* (2006.01)

(52) U.S. Cl.
CPC ............ *B60B 27/065* (2013.01); *B60B 27/02* (2013.01); *B60B 37/04* (2013.01); *B60B 37/10* (2013.01)

(58) Field of Classification Search
CPC ........ B60B 37/10; B60B 27/02; B60B 27/065
USPC ..................................................... 301/111.03
See application file for complete search history.

(56) References Cited

U.S. PATENT DOCUMENTS

| | | | | |
|---|---|---|---|---|
| 6,170,920 B1* | 1/2001 | Markling | .................. | B60B 5/02 301/111.01 |
| 6,886,893 B1* | 5/2005 | Fisch | ........................ | B60B 5/02 301/111.01 |
| 2003/0197423 A1* | 10/2003 | Liao | ........................ | B60B 37/10 301/111.03 |
| 2009/0127923 A1* | 5/2009 | Morris | .................... | B60B 37/10 301/64.707 |
| 2013/0200583 A1* | 8/2013 | Morris | .................. | B65F 1/1473 280/47.26 |

FOREIGN PATENT DOCUMENTS

EP        0508902 A1 * 10/1992    ............ B65F 1/1473

* cited by examiner

*Primary Examiner* — Kip T Kotter
(74) *Attorney, Agent, or Firm* — D. L. Tschida

(57) ABSTRACT

An "L-shaped" bushing assembly having a retainer pin sleeve and axle sleeve. An "L-shaped" retainer pin is fitted to the retainer pin sleeve and provides a handle piece that projects through the walls of the bushing assembly and wheel that is maneuverable to retract and release the retainer pin and wheel from a grooved axle. The L-shaped retainer pin and bias spring are alternatively mounted in single and multi-channel slots to facilitate retainer pin mounting and/or containment of the retainer pin at a storage position. The retainer pin sleeve slots and/or a transverse open slot facilitate cooperation of a wheel removal tool with the retainer pin(s).

10 Claims, 8 Drawing Sheets

REMOVABLE WHEEL RETAINER RELEASE ASSEMBLY

BACKGROUND OF THE INVENTION

The present invention relates to wheels mounted to grooved axles that support trash carts, among other appliances.

A variety of blow molded and injection molded wheels have been developed for coupling to and supporting garbage carts and other appliances. Most typically, these wheels provide mechanisms that secure the wheel to an axle fitted to the cart or appliance. Some mechanisms permit a selective release of the wheel from the appliance.

A wide variety of attachment assemblies have been developed that are either fitted to the axle or the wheel. A preferred wheel attachment assembly for garbage carts and to which the present invention pertains provides an axle that has recessed circumferential grooves at each end of the axle. The cart wheels include spring biased, cylindrical retainer pins secured to bushings adapted to mount in an axle bore of each appliance wheel. The pins are biased in the bushings to nest in the axle grooves upon mounting the wheels to the axle. See for example, U.S. Pat. No. 6,170,920 to Markling.

The cart wheels are mounted to the axle by merely inserting the axle into an axle bore of the bushing until the axle end engages the pin. The pin then retracts toward a rolling surface of the wheel. As the axle groove aligns with the depressed pin, the pin is biased to extend inward and nest into the groove.

The foregoing wheels are typically released from the axle by inserting a discrete probe, e.g. pointed punch or ice pick, through a cylindrical bored aperture through the wall of the wheel or piercing a covered portion of the bore. The tool is then manipulated to engage a shoulder or ledge of an adjacent flanged end of the axle retaining pin. Upon engaging the pin and levering the probe against the body of the wheel as a fulcrum, the retainer pin is radially directed outward toward the tread surface and the end of the pin nesting in the axle groove is released from the axle. The wheel is then released and a replacement wheel can be mounted to the axle and cart or supported appliance. The foregoing probe is removeable and is inserted only during repairs and is not contained to the wheel during normal rolling motion of the wheel.

A variety of other wheel assemblies have also been constructed that cooperate with non-pin type fasteners and associated axle release mechanisms. Each assembly however interacts with the axle to either couple to or release the axle from the wheel.

A variety of retainer pin release assemblies that are "permanently" fitted to the wheel at the time of manufacture have also been developed. These release assemblies include a hand maneuverable lever arm piece fitted to interact with the retainer pin upon directing the lever arm toward the axle to radially direct the pin in a similar fashion as the above-mentioned probe to release the wheel from the axle. Several assemblies of this type are shown and described at US patents to Morris et al. U.S. Pat. Nos. 8,590,984; 9,205,703; and 9,724,964 which are non-removably mounted to a pin sleeve of a bushing secured to the wheel at the time of manufacture. Another pin release assembly that is contained to the wheel is described at U.S. Pat. No. 4,392,690. This axle pin retainer is released via a pull ring fitted to an exposed end of the pin.

The present invention provides an improved bushing assembly having an axle sleeve and a pin sleeve. The bushing assembly is mountable to a molded plastic wheel (e.g. blow molded or injection molded) to receive an axle in the bore of the axle sleeve and an "L-shaped" retainer pin mounted in a bore of a retainer pin sleeve. The retainer pin is biased to engage a groove in the axle. The retainer pin is retracted upon pulling on an upright arm piece and radially directing the pin outward and away from the axle bore to release the wheel from the axle.

The improved bushing assembly of the present invention also provides formed regions adjacent the retainer pin wherein a suitable tool can be fitted to assist wheel release. An open slot suitably shaped and aligned to the retainer pin is also provided in the retainer pin sleeve that can be used alone or in combination with existing flange head retainer pins or the improved L-shaped retainer pin to assure wheel release.

SUMMARY OF THE INVENTION

It is a primary object of the invention to provide a molded plastic wheel (e.g. blow molded or injection molded) wherein a bushing assembly containing a spring biased axle retainer pin is fitted to the wheel to secure the wheel to an axle and selectively permit the release of the wheel from the axle.

It is a primary object of the invention to provide a molded plastic wheel having a bushing assembly mounted to the wheel to receive an axle in a bore of an axle sleeve and secure the axle to the wheel via a retainer pin mounted in a bore of a retainer pin sleeve and biased to mate with a groove in the axle.

It is a further object of the invention to provide a wheel having an "L-shaped" bushing assembly containing a retainer pin having a projecting handle piece and an end piece adapted to engage a groove in the axle that can be maneuvered via the handle piece to retract the pin from engagement with the axle and release the wheel from the axle.

It is a further object of the invention to provide a wheel having a bushing assembly containing an "L-shaped" retainer pin wherein a handle piece projects from a retainer pin sleeve and can be maneuvered to retract an opposed pin head from a groove in an axle fitted to an axle sleeve to release the wheel from the axle.

It is a further object of the invention to provide a wheel having a bushing assembly containing a retainer pin having a handle piece that projects from a retainer pin sleeve and wherein the retainer pin sleeve includes a groove that permits the retraction of the handle piece to disengage the pin from engagement with the axle.

It is a further object of the invention to provide a wheel having a bushing assembly wherein a retainer pin sleeve supports a retainer pin having a projecting handle piece and includes a cooperating groove or slot having a first portion that permits the retraction of the handle piece to disengage the pin from the axle and a second portion that permits the rotation of the retainer pin and temporary support of the handle piece in a retracted condition to facilitate the mounting of a wheel, prior to rotating and returning the handle piece to the first portion.

It is a further object of the invention to provide a wheel having a bushing assembly wherein a retainer pin sleeve supports a spring biased retainer pin and includes a transverse groove or slot suitably shaped to permit inserting a cooperating probe to engage the pin and radially direct the retainer pin to disengage the pin from a supported axle.

It is a further object of the invention to provide a wheel having a bushing assembly wherein a retainer pin sleeve supports a spring biased retainer pin and includes a longitudinal slot wherefrom a handle piece of the pin projects and a transverse groove or slot shaped to independently permit inserting a probe to engage the pin and direct the retainer pin to disengage the pin from a supported axle.

In distinction to the foregoing known wheel release mechanisms and in lieu of using a discrete metal probe, the present invention in one construction of a bushing assembly provides an "L-shaped" retainer pin having a handle piece that extends through a slot in a retainer pin sleeve portion of the bushing and is maneuverable to retract the spring biased retainer pin and disengage the pin from a circumferential groove in an axle that supports a wheel.

In another constructions, a bushing assembly includes an "L-shaped" retainer pin that projects from a longitudinal slot exposed through a pin sleeve having a first slot portion whereat the pin can be retracted to a release condition and a second slot portion whereat the pin can be rotated and temporarily supported. A third slot portion, parallel to the first slot portion facilitates the initial mounting of the retainer pin. The third slot portion is covered by walls of the wheel once the bushing housing is mounted to the wheel.

In yet another construction, a bushing assembly includes a spring biased retainer pin mounted in a retainer pin sleeve and a transverse slot open to a bore of the retainer pin sleeve permits the insertion of a suitable tool to engage a mating surface or recessed ledge at a flanged head of the retainer pin. The slot cooperates with the tool to induce radial pin movement during tool insertion or permit a levering of the probe against the retainer pin to retract the retainer pin from engagement with an axle fitted to an axle sleeve.

The foregoing alternative configurations are disclosed in the following description. Still other objects, advantages, distinctions of the features of the present inventive will become more apparent from the following description with respect to the appended drawings. The description to each disclosed combination should therefore not be literally construed in limitation of the invention. The invention should instead be interpreted within the broad scope of the further appended claims.

Similar components and assemblies referred to in the following description are disclosed at the attached drawings with similar alphanumeric reference characters.

DESCRIPTION OF THE PREFERRED EMBODIMENTS

Figure 1:
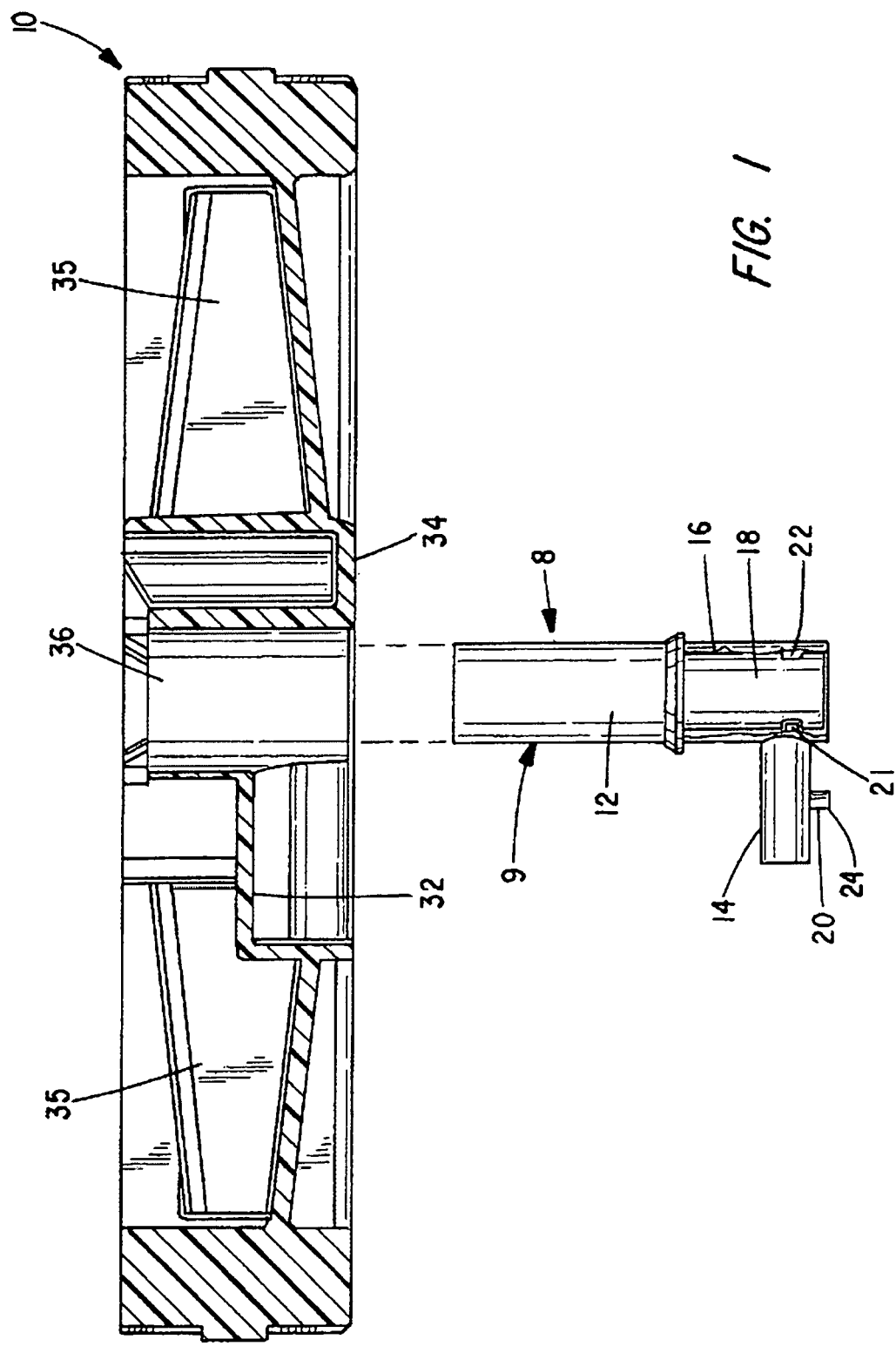
FIG. 1 shows a cross section in partial exploded assembly of a molded plastic wheel relative to an improved multi-sleeved bushing assembly having an "L-shaped" retainer pin resiliently biased in a retainer pin sleeve to selectively engage and disengage from a groove in an axle mounted in an axle sleeve via a retainer pin handle piece that projects from the retainer pin sleeve and is exposed at the wheel.

With attention to FIGS. 1 through 6, views are shown to an improved multi-sleeve bushing assembly 8 that mounts to a molded wheel 10. The body 9 of the bushing assembly 8 is molded to generally exhibit and "L-shape" and includes an axle sleeve 12 and a retainer pin sleeve 14. The retainer pin sleeve 14 transversely projects from the axle sleeve 12. A bore 16 of the axle sleeve 12 is sized to support one end of an axle 18 fitted to an appliance, such as a garbage cart (not shown) and supporting a pair of wheels 10 at opposite axle ends. The wheel 10 can be manufactured using any suitable molding technique, for example, blow molding or injection molding.

Each wheel 10 is secured to the axle 18 with a resiliently biased retainer pin 20 having an end piece 21 that extends from the retainer pin sleeve 14 into the axle bore 16 and nests in a groove 22 in the axle 18. A handle piece 24 projects from an opposite end of the retainer pin 14 and is externally exposed at the wheel 10 to facilitate gripping and retracting the retainer pin 20 to release the retainer pin 20 from the axle 18.

FIGS. 2 through 5 depict particular details to the mounting of the retainer pin 20 to the retainer pin sleeve 14 and the biasing of the retainer pin 20 with a spring 26. The retainer pin 20 and spring 26 are secured in a bore 28 of the retainer pin sleeve 14. A cap piece (not shown) can be fitted to the end of the sleeve bore 28 to restrain the spring 26. Alternatively, the end of the sleeve 14 can be staked or crimped to contain the spring 26 in biasing engagement with the retainer pin 20. A variety of closure, spring retention techniques are available.

A slot 30 extends longitudinally through a wall of the retainer pin sleeve 14 and the handle piece 24 projects through the slot 30. The length of the slot 30 is sized to enable the initial mounting and subsequent movements to extend and retract the retainer pin 20 relative to the axle 18. Presently the slot 30 is exposed at a recess 32 formed in a wheel hub 34 or an adjacent a spoke 35 that radially extends from the wheel hub 34. The wheel hub 34 includes a bore 36 that contains the axle sleeve 12 and the retainer pin sleeve 14 is contained in the recess 32. The recess 32 is presently exposed at an outer face of the wheel 10, relative to the appliance. As desired, the recess 32 can be configured to expose the handle piece 24 from an inner face of the wheel 10.

Figure 12:
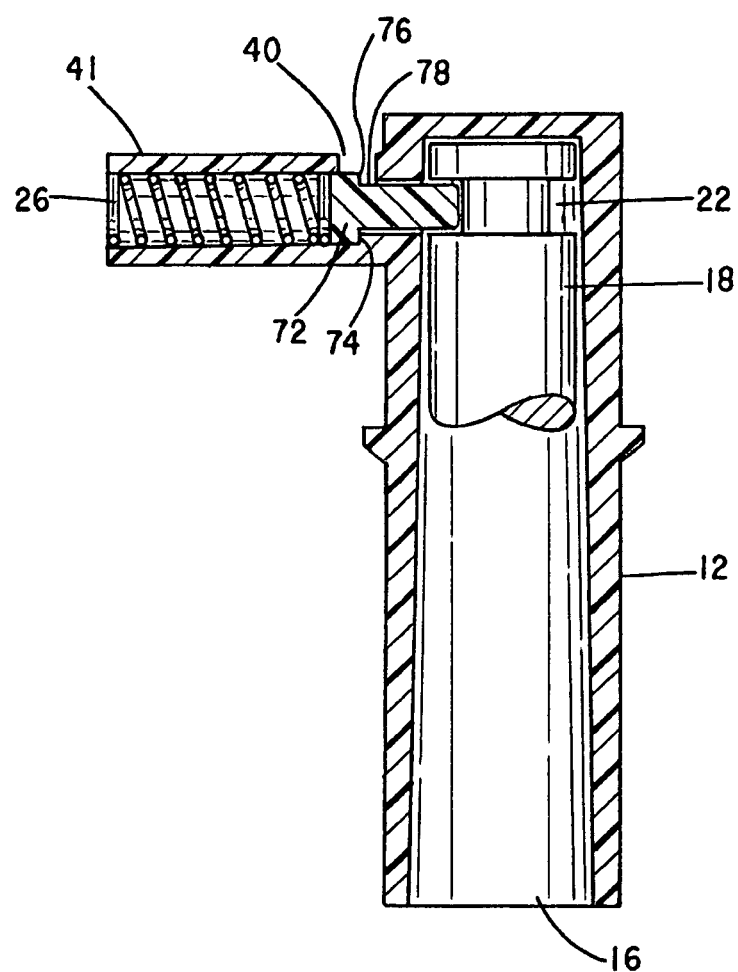
FIG. 12 shows a cross section view taken along section lines 12-12 of FIG. 11 through the bushing and exposing the spring, retainer pin, axle and tool support recess.
Figure 13:
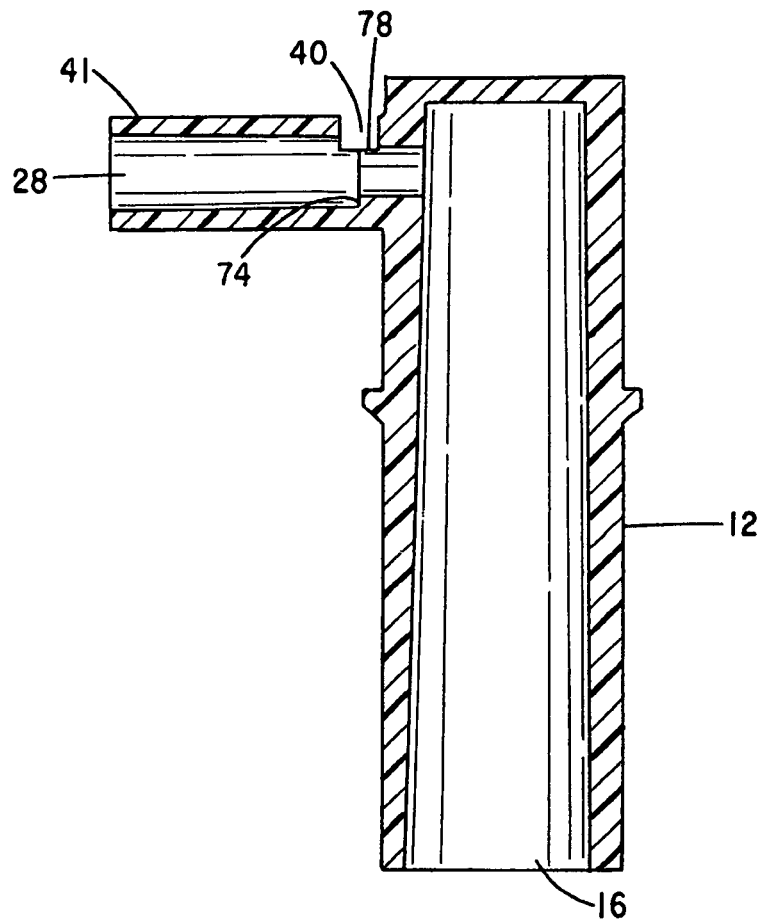
FIG. 13 shows a cross section view taken along section lines 12-12 of FIG. 11 through the bushing without the spring, retainer pin and axle.
Figure 14:
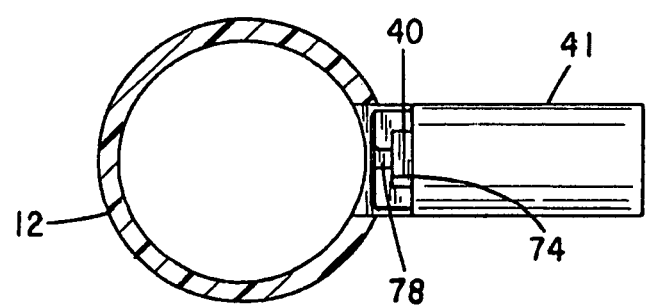
FIG. 14 shows a top view of FIG. 11.

A primary advantage of the foregoing improved bushing assembly 8 and retainer pin 20 is that the wheel 10 can be released from the axle 18 very simply with few mold modifications or additional piece parts. The retainer pin 20 can also be released without the need of a separate release tool. That is, previously an additional bore was molded into a wheel 10 to accept a probe (e.g. ice pick or rigid pointed rod), the probe could be selectively manipulated to engage and release the retainer pin 20 from the groove 22 in the axle 18, for example see FIG. 12.

Figure 3:
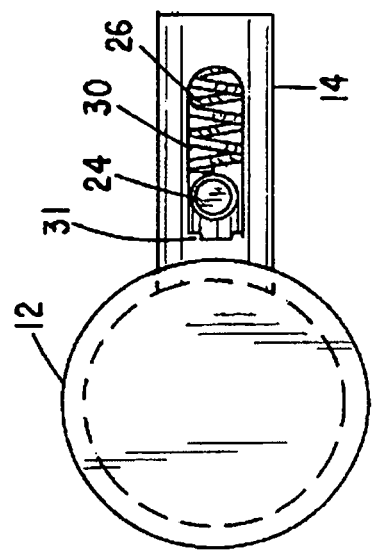
FIG. 3 shows a top view of the bushing assembly and spring biased, "L-shaped" retainer pin and spring of FIG. 2 and a probe space shaped into a handle piece slide-slot.
Figure 2:
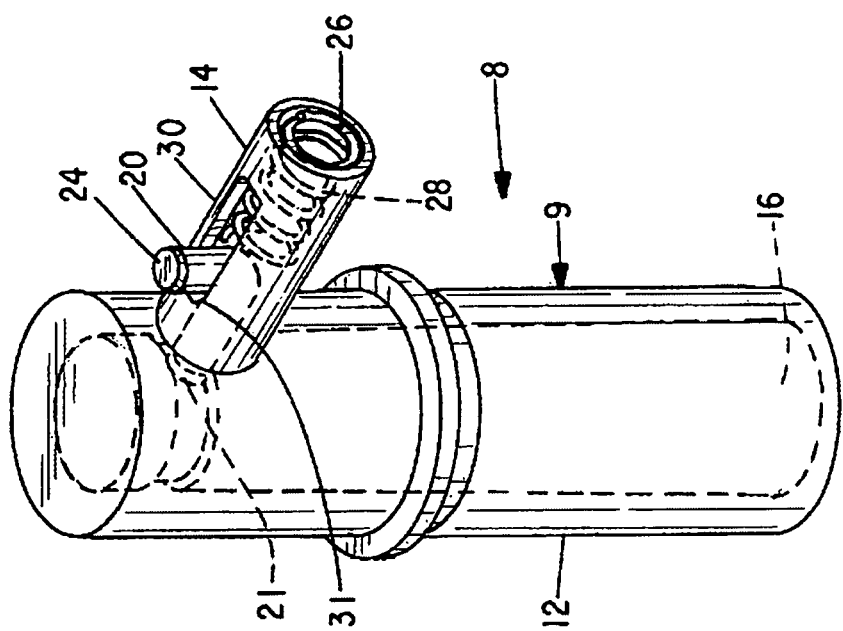
FIG. 2 shows a perspective in partial hidden line of the multi-sleeved bushing assembly of FIG. 1 exposing the "L-shaped" retainer pin and resilient bias spring in the pin sleeve.
Figure 5:
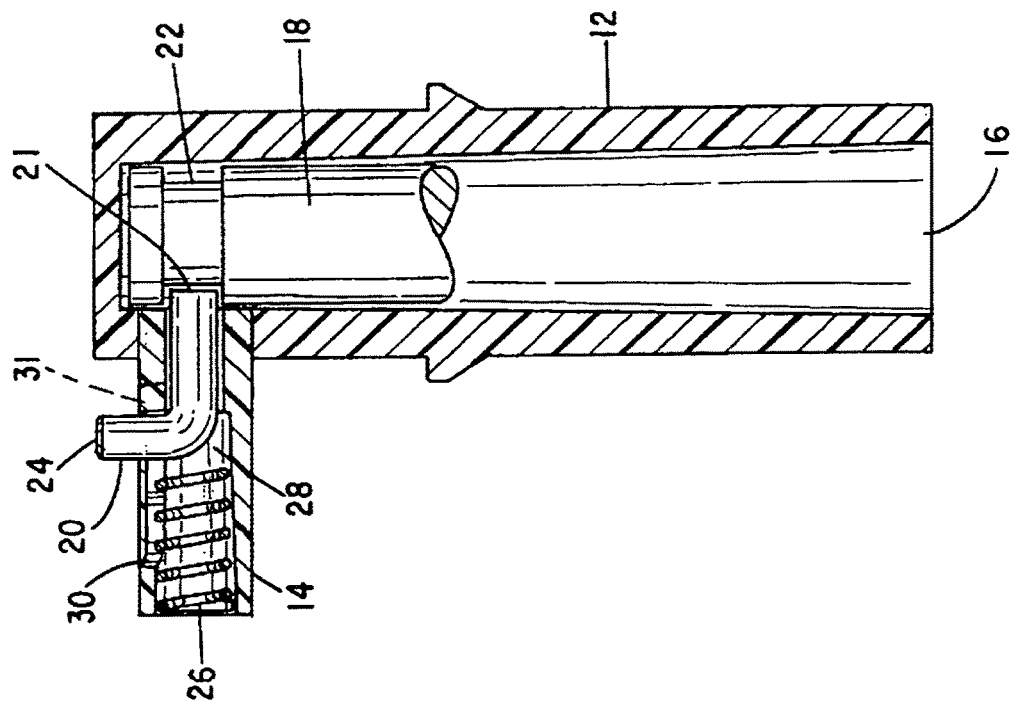
FIG. 5 shows a cross section view taken along section lines 5-5 of FIG. 4 and wherein an axle is shown in partial section supported to the pin.
Figure 4:
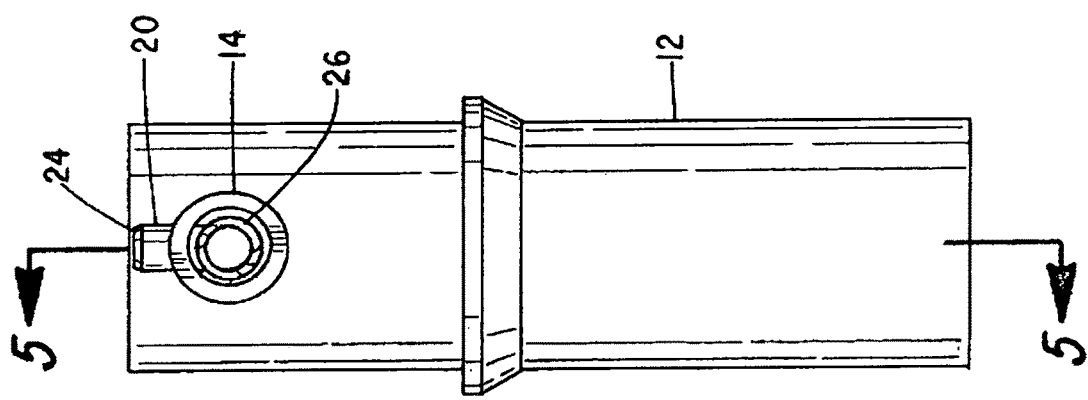
FIG. 4 shows a right side, end-on view of the bushing assembly and spring biased, "L-shaped" retainer pin of FIG. 2.
Figure 7:
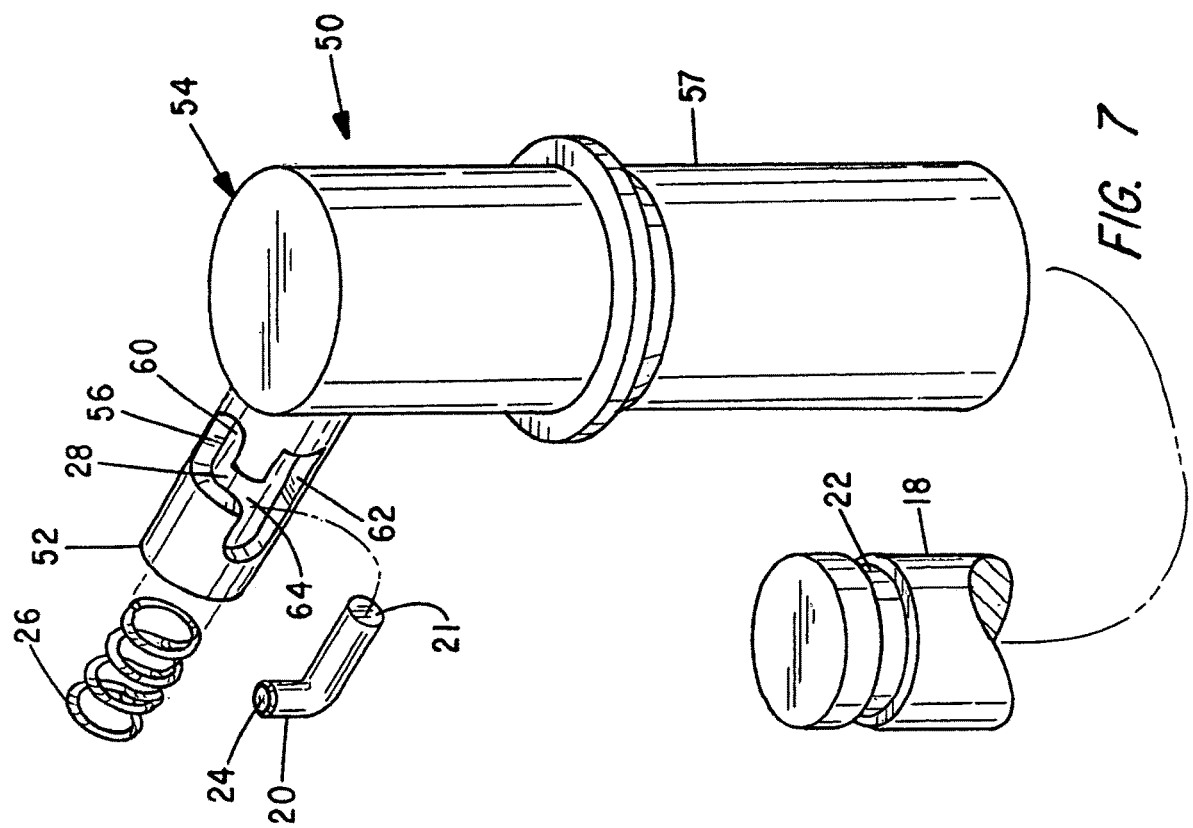
FIG. 7 shows a perspective view in exploded assembly of a multi-sleeved bushing assembly relative to an "L-shaped" retainer pin and bias spring, whereat the retainer pin and spring mount in a pin sleeve with a handle piece projecting from a multi-channel longitudinal slot and whereat the retainer pin can be retracted to release the pin from engaging a groove in an axle mounted in an axle sleeve and rotated to an adjacent longitudinal slot channel where the pin is supported in a retracted condition.
Figure 6:
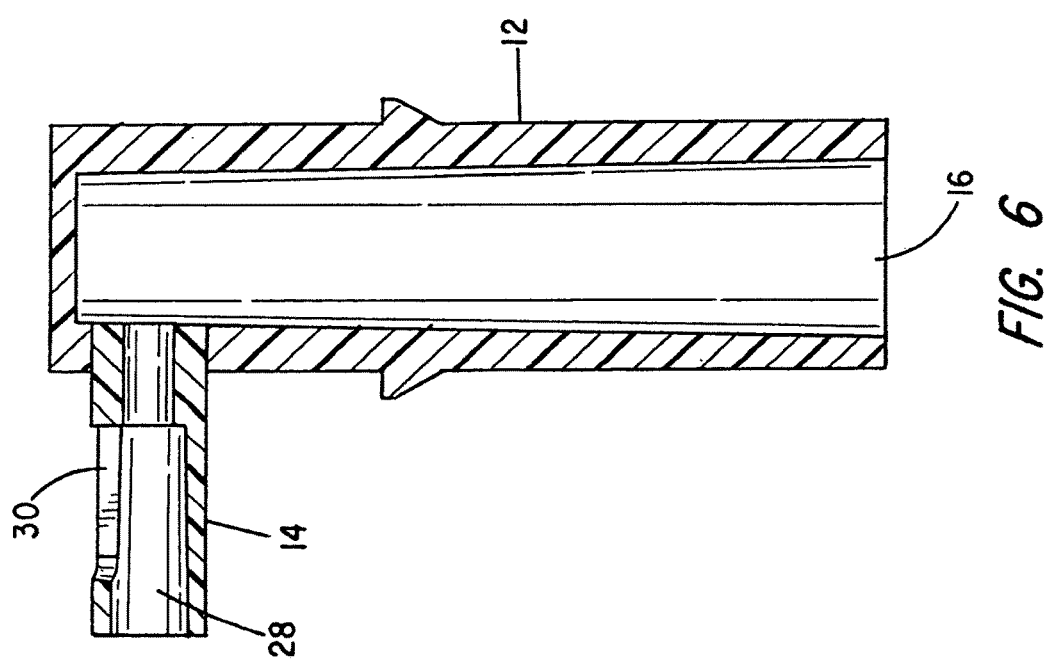
FIG. 6 shows a cross section view taken along section lines 5-5 of FIG. 4 without the spring, retainer pin and axle.
Figure 9:
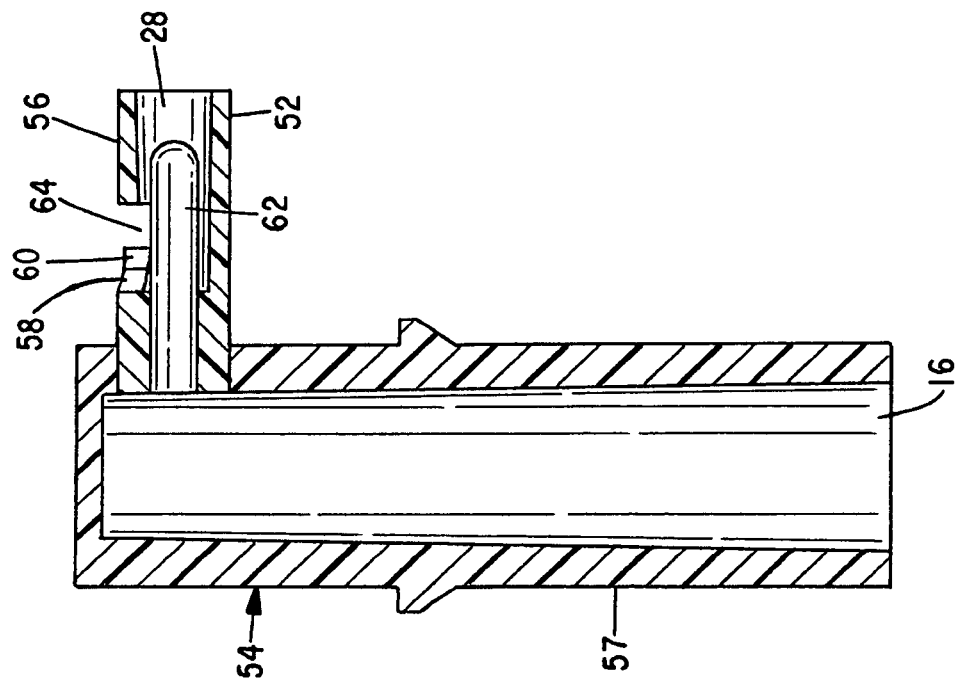
FIG. 9 shows a cross section view taken along section lines 9-9 of FIG. 8 through the bushing without the spring, retainer pin and axle.
Figure 8:
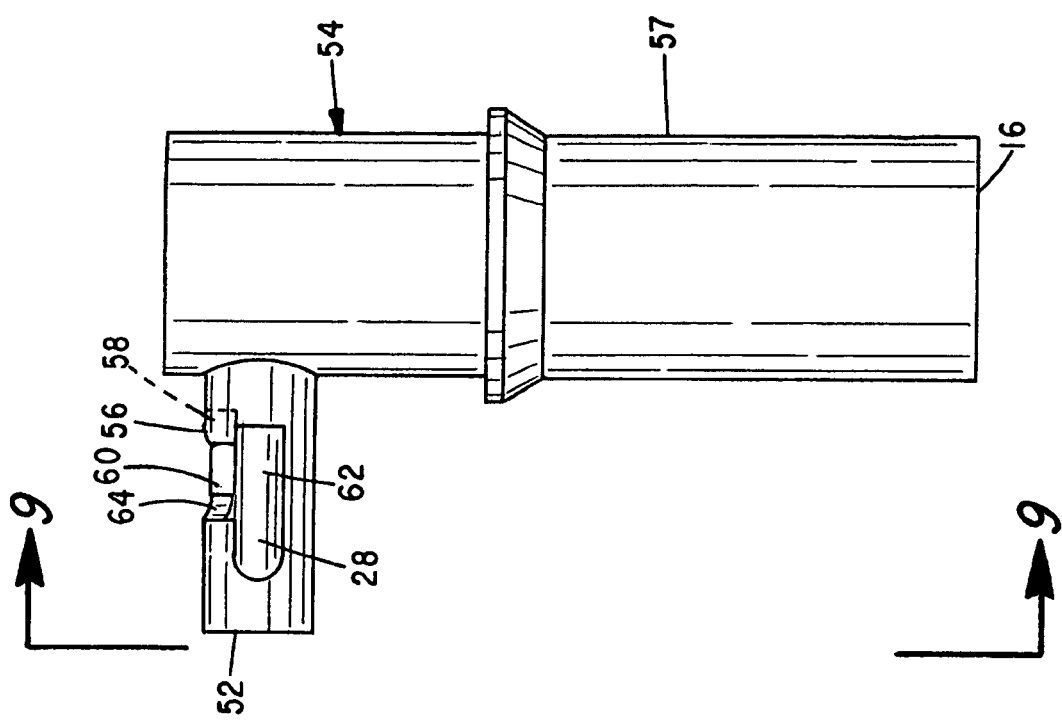
FIG. 8 shows a front view of the bushing assembly of FIG. 7 without the spring, retainer pin and axle.
Figure 10:
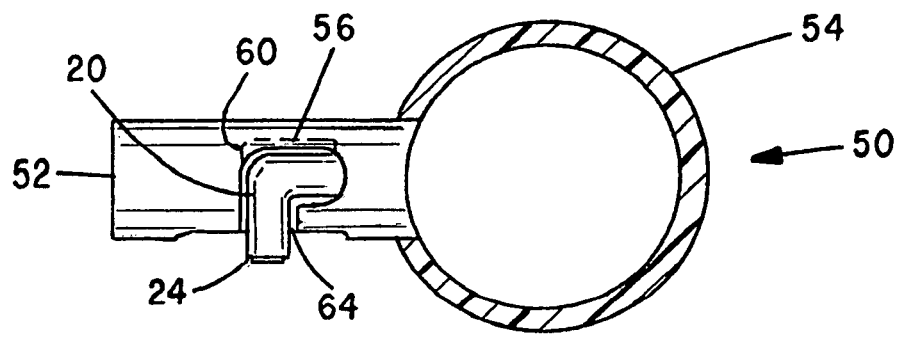
FIG. 10 shows a perspective view of the bushing assembly of FIG. 7 wherein the "L-shaped" retainer pin is rotated and supported in the transverse, second, pin storage channel of the longitudinal slot.
Figure 11:
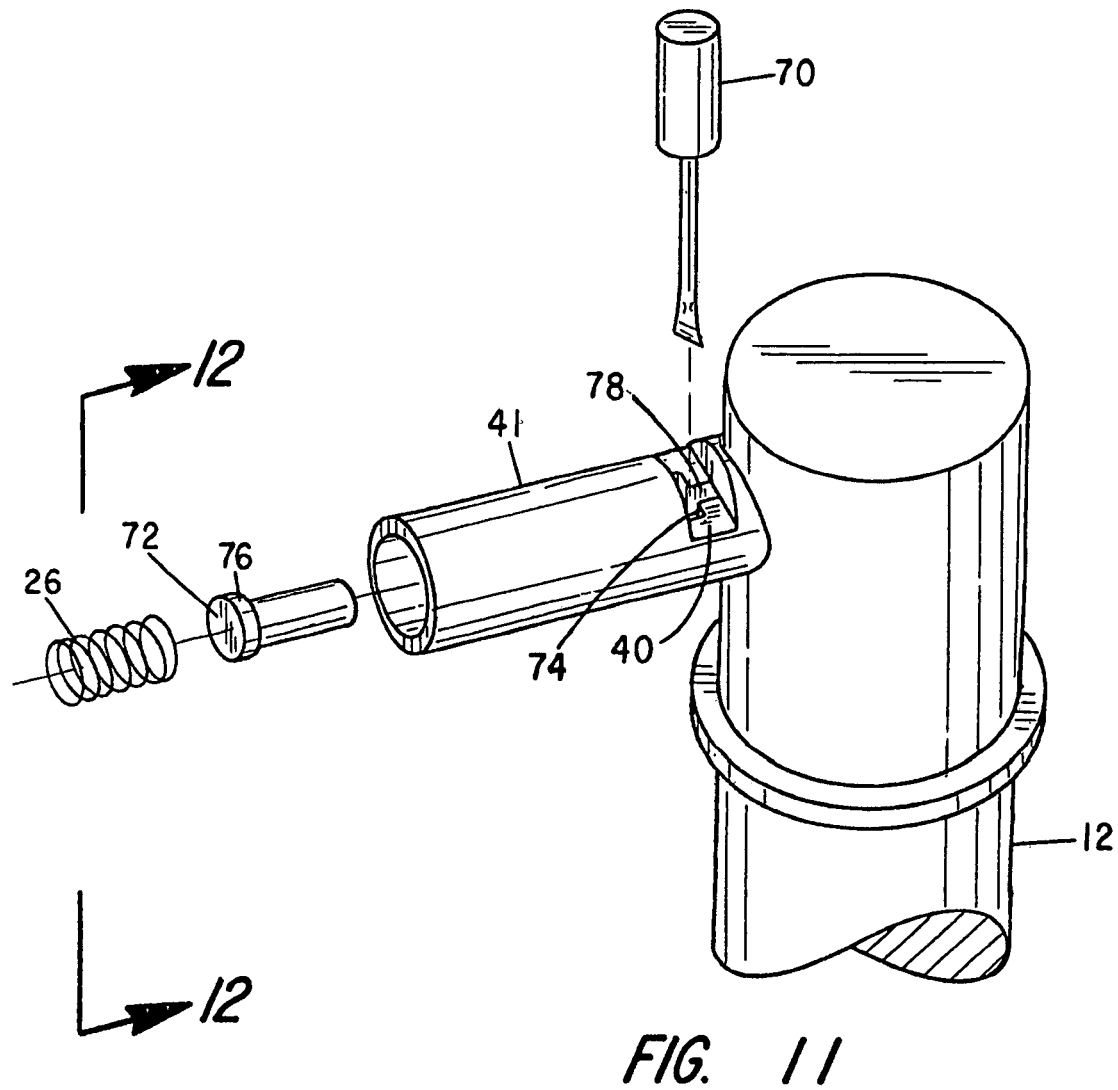
FIG. 11 shows a perspective view in partial exploded assembly of a multi-sleeved bushing assembly wherein the bushing body has an open slot transversely aligned to the retainer pin and through which a spring and biased retainer pin are exposed and which slot is shaped to permit a tool (e.g. screw driver) to engage a recessed ledge of a flanged head of the retainer pin and direct radial movement of the retainer pin during insertion or upon levering the tool against an adjacent wall surface or the retainer pin or axle sleeve to disengage the retainer pin from an axle mounted in the axle sleeve.

FIGS. 2, 3 and 5 depict a recess 31 formed into an end of the slot 30 that is shaped to permit a tool 70 (see FIG. 10) to fit between the handle piece 24 and an end wall of the slot 30. The width of the recess 31 is less than the width of the retainer pin 14 which creates a gap in the slot 30 to receive the tool 70. The depth of the recess 31 can be less than or extend into the retainer sleeve bore 28. If required, upon inserting the tool 70 or applying suitable leverage to the tool 70, the handle piece 24 can be maneuvered radially toward the rolling surface of the wheel 10. The tool 70 may include wedged surfaces to induce retraction upon insertion.

Although use of a separate removal tool 70 can be avoided, the slots 30 and slot 56 discussed below are configured to permit a tool 70 to be fitted between the handle piece 24 and retainer pin sleeve wall surface to obtain additional leverage on the retainer pin 20, if required, to achieve wheel release. FIGS. 11-14 also depict an improved slot 40 that can be formed into a retainer pin sleeve 41 to accept a release tool 70 as a backup access location to grip and release for the foregoing retainer pin 20. The slot 40 is depicted in relation to a known flanged head retainer pin 72, although can be used in cooperation with the retainer pin 20 with suitable access to the handle piece 24.

FIGS. 7 through 10 depict details to an alternative bushing assembly 50 wherein a retainer pin sleeve 52 of the bushing body 54 includes a multi-channeled longitudinal slot 56. An axle sleeve 57 supports a grooved axle 18. As before, the retainer pin 20 is mounted in the retainer pin sleeve 52 and biased with a spring 26. The retainer pin 20 and spring 26 are secured in the bore 28 of the retainer pin sleeve 52 with either a suitable staking or crimping of the sleeve walls or a cap piece fitted to the end of the sleeve bore 28 to contain the spring 26 in biasing engagement with the retainer pin 20.

Alternatively, the bore 28 can be molded closed and the improved slot 56 can be used to mount the retainer pin 20 and spring 26 and/or support the retainer pin 20 in a retracted condition. Regardless of the manner of securing the spring 26 and retainer pin 20 to the retainer pin sleeve 52, the slot 56 in contrast to the slot 30 provides a pair of parallel longitudinal channels 60 and 62 and an interconnecting transverse channel 64. The lower, side channel 62 is used during the initial mounting of the retainer pin 20 and spring 26 into the sleeve bore 28. With both pieces mounted, the handle piece 24 is rotated through the cross channel 64 and into the top channel 60. Once the bushing assembly 50 is fitted to the wheel recess 32, the channel 64 is covered by the sidewalls of the recess 32.

A further advantage of the slot 56 is that the end wall of the cross channel 64 closest an axle 18 can be used to contain the retainer pin 20 in a retracted storage position, prior to mounting the associated wheel 10 to an axle 18. That is, the end of the channel 64 adjacent the axle bore 16 is displaced radially rearward of the end of the adjacent channel 60. Upon positioning the handle piece 24 to rest against the wall of the cross-channel 64, the retainer pin end 21 is supported slightly short of engaging any axle 18 inserted into the axle bore 16. Once an axle 18 is fitted into the axle sleeve bore 16, the handle piece 24 can be rotated into the adjacent channel 60 and released. Upon releasing the handle piece 24 while in the channel 60, the handle piece 24 and retainer pin 20 fully extend and mate with any axle 18 fitted into the bore 16. If later necessary, the handle piece 24 can be retracted and rotated into the cross channel 64 and released to contain the retainer pin 20 during the removal of the wheel 10.

As noted above, the end of the channel 60 closest to the axle bore 16 is also shaped and sized to provide a recess 58 in the end of the channel 60 that facilitates placement of a tool 70 between the handle piece 24 and adjacent surface of the wheel to add leverage if required to release the retainer pin 20. The width and/or shape of the recess 58 is molded to provide a gap between the handle piece 24 and the wall of the retainer pin sleeve 52.

With attention to FIGS. 11-14, the above-mentioned improved release tool slot 40 is shown formed into a retainer pin sleeve 41 and also which can be formed into the pin sleeves 14 or 52 to accept the tool 70 as a backup release mechanism for the foregoing retainer pin 20 or a prior art flanged head retainer pin 72. The slot 40 is depicted in relation to a known flanged head retainer pin 72, although can be formed and exposed on the retainer pin sleeve 14 opposite the slot 30 or channel 60 on pin sleeve 52. The slot 40 can also be formed into the side walls of the retainer pin sleeve 14 or 52, for example, to be partially covered by the walls of the recess 32. An interior ledge 74 is formed into the sleeve 41 to support a recessed flange surface 76 at the head of the retainer pin 72. The head flange surface 76 abuts the surface 74 and controls the mounting depth of the retainer pin 72 relative to engaging an axle groove 22.

The width of the slot 40 otherwise is sized to provide a gap 78 between the recessed flange surface 76 and the interior end wall of the slot 40 sufficient to permit the mounting of the tool 70 in the gap 78. The head of the tool 70 can be shaped to directly direct movement of the retainer pin 72 as the tool 70 is inserted, such as via a tapered surface. Alternatively, the tool 70 can also be levered against the end wall of the slot 40 to radially direct and disengage the retainer pin 72 from the axle groove 22. Where the tool 70 engages a surface of the retainer pin 20 other than the handle piece 24, a groove, knurling or other feature can be formed into the retainer pin 20 in a complementary fashion to the flanged head surface 76 to facilitate gripping by the tool 70.

Known wheels have previously included a blind bore in the retainer pin sleeves in lieu of a slot 40. The bores typically are flashed over with plastic which adds difficulty to the fitting of a pointed probe into the wheel 10 and being assured of proper positioning relative to the head of the retainer pin 72. When adapted to a retainer pin sleeve 14 or 52, the improved slot 40 and enhanced spacing 78 between the head piece 24 of the retainer pins 20 and slots 30 and/or 56 overcomes this deficiency and facilitates wheel removal and appliance repair. The positioning and maneuvering of the tool 70 is readily visible in the exposed forward recess 58 of the slot 56.

While the invention has been described with respect to alternative presently preferred assemblies and considered improvements, modifications and/or alternatives thereto, still other assemblies and arrangements may be suggested to those skilled in the art. It is therefore to be appreciated that the features of the foregoing cart assembly can be arranged in different combinations to accommodate a variety of differing constructions. The foregoing description should therefore be construed to include all those embodiments within the spirit and scope of the following claims.

What is claimed is:

1. A molded wheel comprising:
   a) a hub having a primary bore and a rolling surface concentrically displaced from said hub and wherein said wheel is adapted to mount to an axle;
   b) a bushing including an axle sleeve mounted to said primary bore and having an axle bore adapted to contain said axle and wherein said bushing further includes a retainer pin sleeve having a retainer pin bore communicating with said axle bore;
   c) a retainer pin having a longitudinal portion and a handle portion transversely projecting from said longitudinal portion, wherein said retainer pin is reciprocally mounted in said retainer pin bore, wherein said retainer pin is supported in a longitudinal slot of said retainer pin sleeve and through which longitudinal slot said handle portion extends, wherein said longitudinal slot comprises a first longitudinal channel portion, a second longitudinal channel portion extending parallel to said first longitudinal channel portion and a transverse channel portion communicating between said first and second longitudinal channel portions, wherein said second longitudinal channel portion permits insertion of said retainer pin into said retainer pin bore and manipulation of said handle portion into said first longitudinal channel portion, and wherein said handle portion projects sufficiently from said longitudinal slot to permit hand manipulation to radially and reciprocally extend and retract a fore end of said retainer pin from said axle bore; and
   d) a spring mounted in said retainer pin bore to engage and bias said retainer pin toward said axle bore.

2. A wheel as set forth in claim 1 wherein said longitudinal slot includes a recess communicating with said retainer pin bore and shaped to accept a tool to engage and independently direct movement of said retainer pin relative to said axle bore.

3. A wheel as set forth in claim 1 wherein said transverse channel portion is radially displaced apart from a forward end of said first longitudinal channel portion adjacent said axle bore and wherein said handle portion can be manipulated and supported in said transverse channel portion to prevent engagement of said retainer pin with an axle inserted into said axle bore.

4. A wheel as set forth in claim 1 wherein a forward end of said first longitudinal channel portion includes a recess shaped to accept a tool inserted between said handle piece and a wall surface of said wheel, whereby said tool can independently radially retract said fore end of said retainer pin from said axle bore.

5. A wheel as set forth in claim 1 wherein said second longitudinal channel portion is covered by a wall of a recess formed into said wheel upon mounting said retainer pin sleeve into said recess and said axle sleeve into said primary bore.

6. A bushing adapted to mount to a separately molded wheel and supporting axle comprising:
   a) an axle sleeve having an axle bore configured to contain said axle;
   b) a retainer pin sleeve having a retainer pin bore communicating with said axle bore;
   c) a retainer pin having a longitudinal portion and a handle portion transversely projecting from said longitudinal portion, wherein said retainer pin is reciprocally mounted in said retainer pin bore, wherein said handle portion projects from a slot in a sidewall of said retainer pin sleeve, wherein said slot comprises a first longitudinal channel portion, a second longitudinal channel portion extending parallel to said first longitudinal portion and a transverse channel portion communicating between said first and second longitudinal channel portions, wherein said second longitudinal channel portion permits insertion of said retainer pin into said retainer pin bore and manipulation of said handle portion into said first longitudinal channel portion and wherein said handle portion projects sufficiently from said slot to permit hand manipulation to radially and reciprocally extend and retract a fore end of said retainer pin from said axle bore; and
   d) a spring mounted in said retainer pin bore to engage and bias said retainer pin toward said axle bore.

7. A bushing as set forth in claim 6 wherein said slot includes a recess communicating with said retainer pin bore and shaped to accept a tool to engage and independently direct movement of said retainer pin relative to said axle bore.

8. A bushing as set forth in claim 6 wherein an end portion of said slot includes a recess shaped to accept a tool inserted between said handle portion and a wall surface of said wheel to engage and independently direct movement of said retainer pin relative to said axle bore.

9. A bushing as set forth in claim 6 wherein a forward end of said first longitudinal channel includes a recess shaped to accept a tool inserted into said recess to engage and independently direct movement of said retainer pin relative to said axle bore.

10. A bushing as set forth in claim 6 wherein said second longitudinal channel portion is covered by a wall of a recess formed into said wheel upon mounting said retainer pin sleeve into said recess and said axle sleeve into said primary bore.

\* \* \* \* \*